United States Patent
Staggs

(10) Patent No.: US 7,933,907 B2
(45) Date of Patent: Apr. 26, 2011

(54) METHODS AND SYSTEMS FOR PROVIDING PERSONALIZED FREQUENTLY ASKED QUESTIONS

(75) Inventor: Robert Staggs, San Francisco, CA (US)

(73) Assignee: The Western Union Company, Englewood, CO (US)

(*) Notice: Subject to any disclaimer, the term of this patent is extended or adjusted under 35 U.S.C. 154(b) by 490 days.

(21) Appl. No.: 10/783,715

(22) Filed: Feb. 19, 2004

(65) Prior Publication Data

US 2005/0187929 A1    Aug. 25, 2005

(51) Int. Cl.
*G06F 17/30* (2006.01)

(52) U.S. Cl. .................. 707/751; 707/769; 707/768

(58) Field of Classification Search .................. None
See application file for complete search history.

(56) References Cited

U.S. PATENT DOCUMENTS

| | | | |
|---|---|---|---|
| 5,842,221 A * | 11/1998 | Schmonsees | 707/104.1 |
| 6,243,090 B1 * | 6/2001 | Machiraju et al. | 715/709 |
| 6,377,944 B1 * | 4/2002 | Busey et al. | 707/3 |
| 7,146,159 B1 * | 12/2006 | Zhu | 455/414.1 |
| 7,505,921 B1 * | 3/2009 | Lukas et al. | 705/26 |
| 2003/0018629 A1 * | 1/2003 | Namba | 707/3 |
| 2003/0200118 A1 * | 10/2003 | Lee et al. | 705/2 |
| 2004/0133474 A1 * | 7/2004 | Tami et al. | 705/16 |
| 2004/0249251 A1 * | 12/2004 | Olschafskie | 600/300 |

OTHER PUBLICATIONS eHelp Corporation's New DynaHelp 1.5 is the Only eBusiness Self-Assistance Software That 'Learns' From Customer Behavior. Text: DynaHelp Analyzes Customer Interactions to Dynamically Improve Web Site Usability, p. 1-3 Oct. 23, 2000.*
Amazon.com web page: www.amazon.com/exec/obidos/tg/browse—FAQ's, Printed on May 7, 2004.

* cited by examiner

*Primary Examiner* — Charles Rones
*Assistant Examiner* — Belix M Ortiz
(74) *Attorney, Agent, or Firm* — Fitzpartick Townsend & Stockton LLP

(57) ABSTRACT

A method of selecting a set of questions to display comprises receiving a request from a user to access a frequently asked questions (FAQ) page. Account data for the user is retrieved. A set of questions is selected to display to the user based on the account data. This permits a set of questions to be automatically selected based on user account data.

23 Claims, 5 Drawing Sheets

METHODS AND SYSTEMS FOR PROVIDING PERSONALIZED FREQUENTLY ASKED QUESTIONS

BACKGROUND

Many Internet sites provide a frequently asked questions (FAQ) page to provide answers to questions the site provider believes that users may have. For example, a FAQ page for a bank loan may include questions, and the corresponding answers, about repayment options for the bank loan. Traditionally, these FAQ pages are static Hyper Text Markup Language (HTML) files.

Static files have inherent limitations on the type of information provided to users and the manner in which the information is displayed. One limitation is that the same questions and answers are displayed to all users of the Internet site. Because of this limitation, users may be given information that does not apply to them. For instance, a FAQ may be displayed on a product that is not available to the user. Another limitation with static files is that the answers must be made generic enough to apply to all users. Finally, the questions are presented in the same order to all the users. Thus, a user may not find an answer to his or her particular question until the end of the page.

BRIEF SUMMARY

Methods and systems are disclosed for providing personalized frequently asked questions (FAQs) to a user. In one embodiment, the method comprises receiving a request from a user to access a FAQ page. Account data is retrieved for the user. A set of questions is then selected to display to the user based on the account data. The method may also include formatting a set of personalized answers to the set of questions. The set of personalized answers may be formatted by selecting an answer to a question from a set of answers for the questions. Alternately, or additionally, the set of personalized answers may be formatted by formatting at least one question to display information specific to the user by using the user account data. The method may also include determining an order for the set of questions using the user data and displaying the set of questions in the determined order.

In an alternate embodiment, a system for displaying personalized FAQs to a user is disclosed. The system comprises a first set of data containing a plurality of questions. The system also includes a second set of data containing account data for a plurality of users. Logic is communicatively coupled to the first set of data and the second set of data. The logic receives a request from a user to access a FAQ page. The logic retrieves from the second set of data the account data for the user and selects a group of questions from the first set of data to display to the user based on the account data for the user. The system may also include a third set of data containing a plurality of answers. Each of the answers is associated with at least one of the questions and each of the questions is associated with one or more answers. The logic may select an answer to one of the group questions, based on the account data for the user, from a plurality of answers contained in the third set which are associated with the group question. Alternately or additionally, the logic may also format an answer to one of the group questions by inserting data obtained from the account data for the user into the answer. The system may also include a display mechanism to display the group of questions.

BRIEF DESCRIPTION OF THE DRAWINGS

Illustrative embodiments in accordance with the invention are illustrated in the drawings in which.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 1:
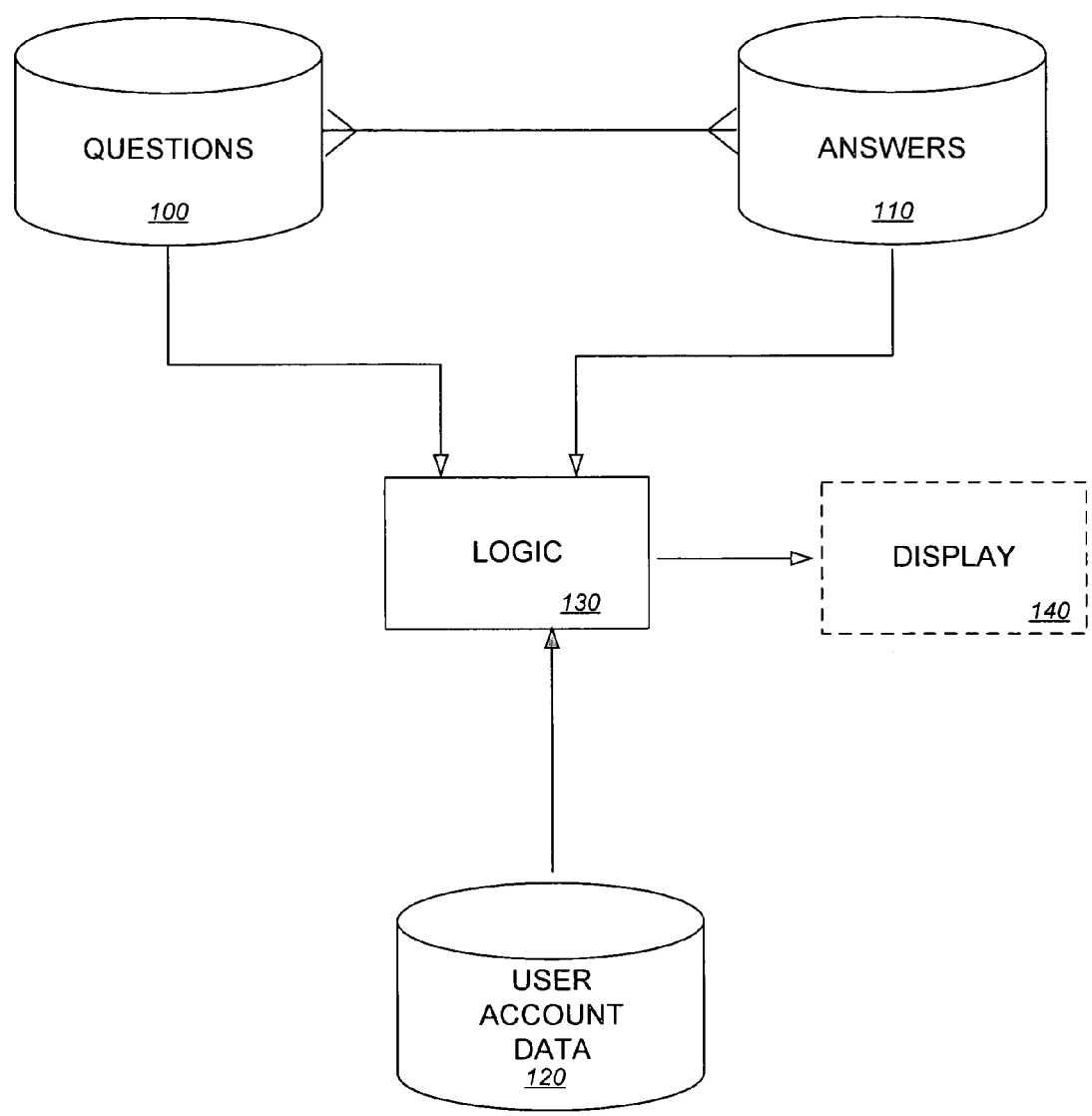
FIG. 1 illustrates a system that may be used to provide personalized frequently asked questions (FAQs) to a user.

FIG. 1 illustrates a system that may be used to provide personalized frequently asked questions (FAQs) to a user. The system may include a set of questions 100 from which questions may be selected to display to a user. The set of questions 100 may be contained in a database, spreadsheet, text file, Hyper Text Markup Language (HTML) page, Extended Markup Language (XML) page, internal software records, or other format. Some questions 100 may be pre-selected to display to all users. As will be described in further detail below, other questions may be selected based on information specific to the user.

The system may further include a set of answers 110 to the questions 100. Similar to the set of questions 100, the set of answers 110 may be contained in a database, spreadsheet, text file, HTML page, XML page, internal software records, or other format. Additionally, the set of answers 110 may be stored along with the set of questions 100 (e.g., in the same database or HTML page). Each answer 110 may be associated with one or more questions 100. Similarly, each question 100 may have one or more possible answers 110. In one embodiment, the answer 110 to a question may be selected from the set of possible answers for the question by using the user account data 120.

The system also includes user account data 120. User account data may contain account data for a plurality of users. User account data refers to data stored about a user and does not imply any relationship to a financial account. By way of example, the user account data may include information obtained from the users, information obtained from external sources, and/or information obtained from monitoring user activity. The user account data 120 may be stored in a database, spreadsheet, text file, internal software records, or other format. In alternate embodiments, the system may not include user account data 120. Instead, user-specific information may be obtained by logic 130. For instance logic 130 may ask the user a series of questions or logic 130 may obtain user specific information from a computer or other type of machine.

Logic 130 is communicatively coupled to the set of questions 100, the set of answers 110, and the user account data 120. By way of example, logic 130 may be machine-executable instructions, such as a JAVA program. Logic 130 may receive a request from a user to access a FAQ page. Logic 130 may then select a group of questions from the set of questions 100 to display to the user based on user account data for the user 120. Alternately, or in addition, logic 130 may be used to format one or more personalized answers to the questions by using the user account data for the user 120. In one embodiment, the personalized answers may be formatted by inserting user-specific data that was obtained from user account data 120 into an answer. In another embodiment, the personalized answers may be formatted by selecting an answer to a question from a set of possible answers using the user account data for the user 120. In one embodiment, the system may also include a display mechanism 140 to display the questions and answers to the user.

In the configuration described above, different components were described as being communicatively coupled to other components. A communicative coupling is a coupling that allows communication between the components. This coupling may be by means of a bus, cable, network, wireless mechanism, program code call (e.g., modular or procedural call) or other mechanism that allows communication between the components. Thus, it should be appreciated that logic 130, user account data 120, questions 100, answers 110, and display 140 may reside on the same or different physical devices. By way of example, display 140 may be a web browser on a remote client. Additionally, it should be appreciated that in alternate embodiments, the system described in FIG. 1 may contain additional or fewer components.

Figure 2:
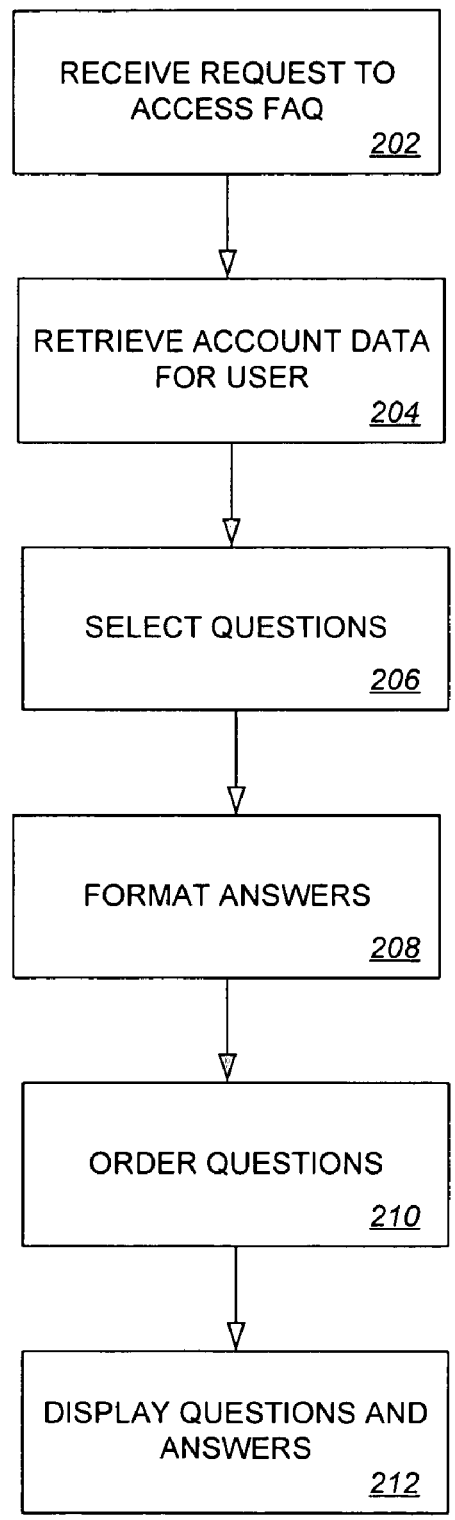
FIG. 2 is a flow diagram of a method for providing personalized FAQs to a user.

FIG. 2 is a flow diagram illustrating an exemplary method that may be used to provide personalized FAQs to a user. The method may begin by receiving 202 a request to access a FAQ page from a user. By way of example, the request to access a FAQ page may be initiated by a user by clicking on a hypertext link to the FAQ page. Account data for the user is then retrieved 202. Alternately, as previously described, information may be obtained from the user by asking the user to answer a series of questions or user specific information may be obtained from the user's computer or other type of machine.

A set of questions is then selected 206 to display to the user. Some questions that are selected 206 may be questions that are displayed to all users, while other questions are selected 206 based on the account data for the user. Additionally, a set of answers to the set of questions are formatted 208. As with the set of questions, some of the answers may be generic answers that are provided to all the users. Other answers may be personalized answers that are personalized for the user based on the account data for the user. One or more of the answers may be personalized by selecting an answer to a question from a set of answers for the question based on the account data for the user. Alternately, or additionally, one or more answers may be personalized by formatting the answer to display information specific to the user by using information retrieved 204 from the user account data.

In one embodiment, the questions may then be ordered 210 using the account data for the user. The account data may be examined to determine recent activities or changes made to the user account. Questions related to the recent activities or changes may be accorded a higher display order than other questions. The selected questions and formatted answers 208 are then displayed 212 to the user. In alternate embodiments, the questions may be displayed in the same order to all the users and thus the ordering 210 of questions may not be performed.

It should be appreciated that in alternate embodiments, the method of providing personalized FAQs may not include all of the blocks illustrated in FIG. 2. For example, the personalized FAQs provided to the user may consist of answers personalized to the user, but the questions may be generic questions provided to all users. Thus, block 206 may not be performed. As another example, the questions may not be ordered 210 for a user. Instead, all of the questions and answers may be displayed 212 in the same order for all users.

The method for providing personalized FAQs may be used in a variety of applications. One exemplary application in which personalized FAQs may be used is in a FAQ page for a loan acceleration program. An example of a loan acceleration program for which FAQs may be displayed may be found in U.S. patent application Ser. No. 10/168,871, the details of which are incorporated herein by reference. A provider of an FAQ page for a loan acceleration program may have a variety of user account data available to it. This user account data may include information on the repayment schedule for the loan (e.g., biweekly, bimonthly, monthly, etc.), the loan amount, the payment amount, the eligibility of the user for services provided by the loan acceleration program, whether the payment amount has recently changed, whether the loan has been recently sold, and/or other types of information related to the user's loan and the type of loan acceleration program.

The user account data may be used to provide personalized FAQs to the user about his or her loan acceleration program. For example, a question may be selected 206 to display to the user based on the user's repayment schedule for the loan. Thus, the user may only see one question related to his or her specific repayment schedule rather than a series of questions related to all the types of repayment schedules available to all users. As another example, questions related to services that may not be available to all users (e.g., whether the user's loan acceleration program is portable) may only displayed if the user account data indicates the user is eligible for the service.

Additionally, or alternately, answers to the questions may be formatted 208 based on the user account data for the loan acceleration program. For example, an answer to a question related to a payment amount may be formatted to contain the payment amount paid by the user. As with the questions, an answer may be selected from a group of answers to a question based on user eligibility for a service offered by the loan acceleration program. Other information contained in the user account data may also be used to select personalized answers.

Furthermore, questions selected for display may be ordered 210 based on recent activity or changes to the user account. For example, if the user account data indicates the user's loan was just sold, question(s) related to the sale of loans may be ordered so that they display before other questions. As another example, if the user account data indicates the user's payment has just changed or will recently change, questions related to payment amount changes can be ordered higher than other questions. The ordering of questions may also be used to market products that may be of interest to the user. Other criteria could also be used to display the questions in an order personalized for the user.

Personalized FAQs are not limited to the loan acceleration program example. As another example, a travel website could use personalized FAQs to display personalized questions and answers related to an upcoming trip booked by the user. The FAQs could be personalized to include questions related to the location to which the user is traveling. Personalized FAQs could also be selected to market services for which the user has not yet taken advantage (e.g., rental car, hotel, travel insurance, etc.). Airlines, hotels, rental car agencies, and other entities having reward programs could also personalize FAQs for the particular rewards for which a user is qualified. In addition to the question selection, the answers could also be formatted to be personalized to the user and/or the questions could be displayed in a personalized order.

Another example in which personalized FAQs may be used are for FAQs for an online store. Online stores could use personalized FAQs to display personalized questions and answers related to a recent or outstanding order placed by the user. These questions and answers could include information about whether an order was shipped, the expected arrival date, shipping costs to the user's address, and other types of information personalized for the user. Additionally, online stores could personalize FAQs to market products that may be of interest to the user. These questions could be ordered with a high priority so that the user will view the marketing questions first. Other criteria could also be used to order the questions for the user.

As can be clearly appreciated, many other applications could take advantage of personalized FAQs. In addition to the topic specific FAQs, personalized FAQs can be used to display questions for services or products to only those users who qualify for the services or products. Personalized FAQs can also be used to market services that may be of interest to the user. In fact, just about any type of application in which user data can be obtained (either from stored account data, asking the user a series of questions, and/or obtaining information from the user computer or other type of machine) can take advantage of personalized FAQs.

Figure 3:
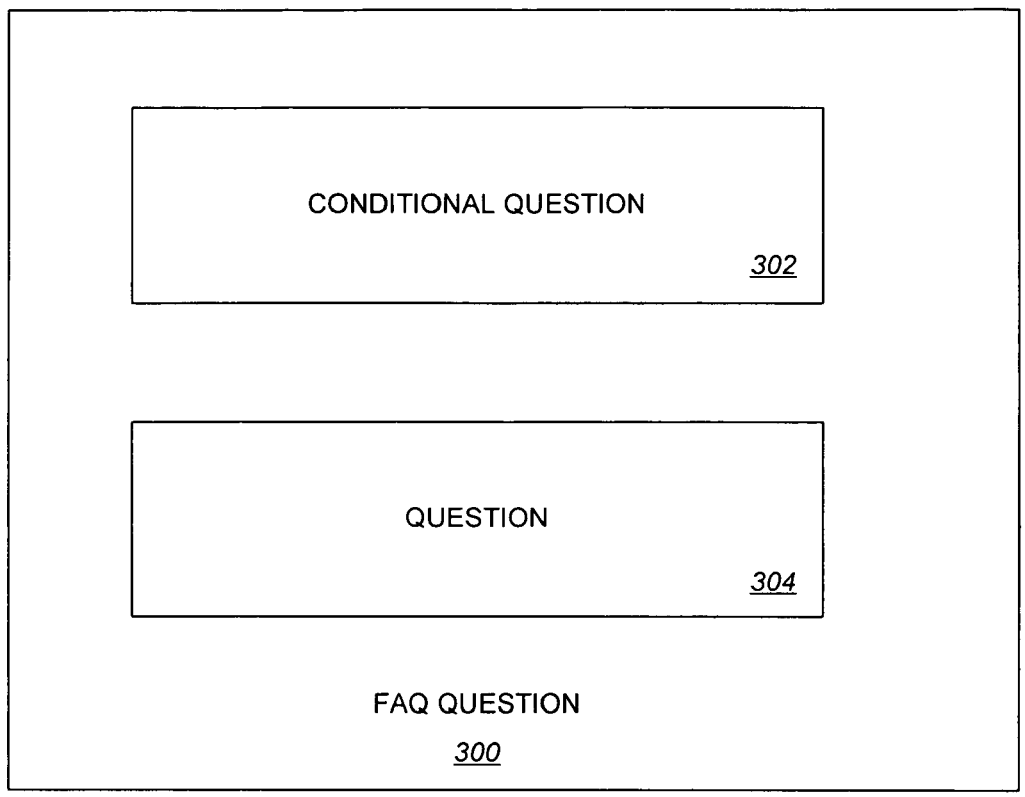
FIG. 3 is a block diagram illustrating a set of conditional questions from which a question may be selected.
Figure 4:
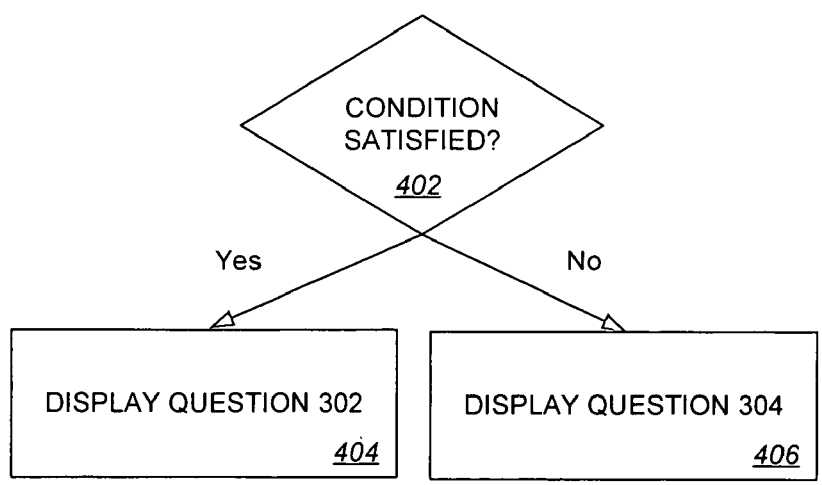
FIG. 4 is a flow diagram illustrating a method that may be used to select a conditional question.

Referring to FIGS. 3 and 4, a method of selecting a question from a group of questions will now be described. A question may be a conditional question that is only displayed if a particular condition is satisfied. FIG. 3 illustrates a block diagram in which a either conditional question 302 or question 304 is selected for display of FAQ question 300. As shown in FIG. 4, if the condition for displaying conditional question 302 is satisfied 402, then question 302 is selected for display 404 to the user. A determination may be made as to whether the condition is satisfied by using the user account data. If the condition is not satisfied, question 304 is selected for display 406 to the user. It should be appreciated that in alternate embodiments, the FAQ question 300 may be selected from a larger group with more conditions than illustrated in FIGS. 3 and 4. Additionally, in one embodiment, FAQ question 300 may not have a default question that is displayed if no conditions are satisfied (question 304). Instead, if none of the conditions for the group of questions from which FAQ question 300 is selected are satisfied, FAQ question 300 may not be selected for display to the user.

Figure 5:
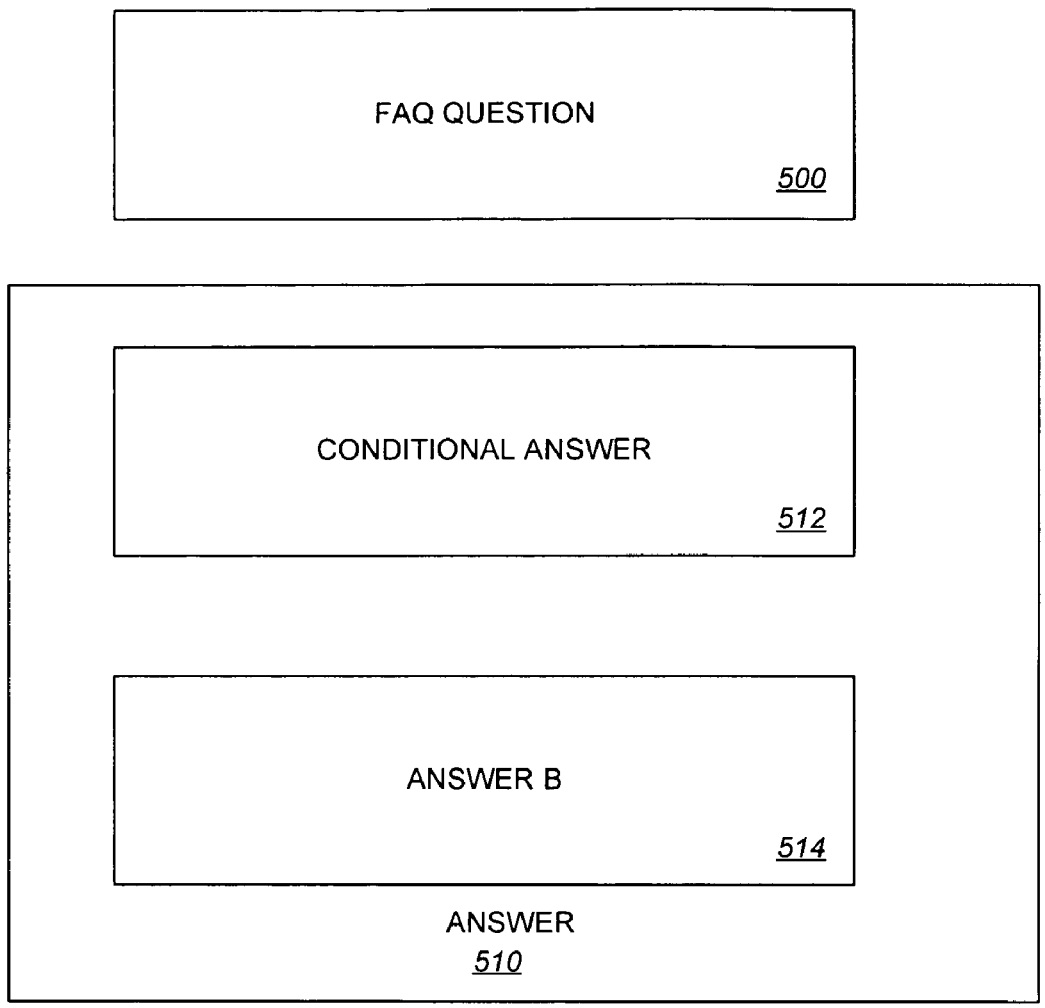
FIG. 5 is a block diagram illustrating a set of conditional answers from which an answer to an FAQ may be selected.

FIG. 5 illustrates the selection of an answer 510 to an FAQ question 500 from a plurality of possible answers. FAQ question 500 has two possible answers that may be displayed to the user. The selection of the answer 510 may be dependent on the user account data. Conditional answer 512 may only be displayed to the user if it is determined that the condition for the answer is satisfied. Otherwise, answer 514 may be selected. It should be appreciated that in alternate embodiments, the answer 510 may be selected from a larger group with more conditions than illustrated in FIG. 5.

Figure 6:
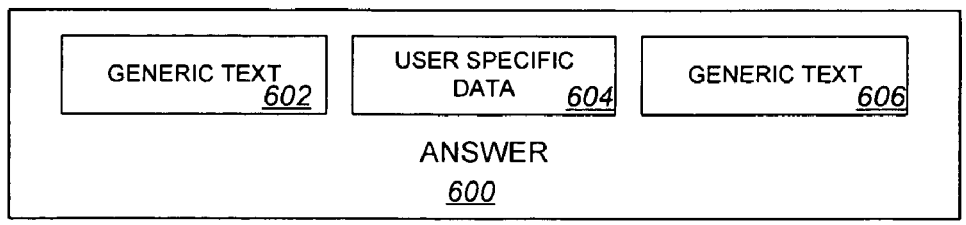
FIG. 6 is a block diagram illustrating a answer formatted with user specific data.

FIG. 6 illustrates an answer that may be formatted with user specific data. Answer 600 may contain generic text 602, 606 that is displayed to all users. User specific data may be inserted between generic text 602 and generic text 606. As one example, answer 600 to a question about transaction charges may be formatted as "Your program charges a fee of <Transaction_Amount> per withdrawal." The "Transaction_Amount" variable is replaced with the user's transaction amount. This information may have been obtained from the user account data. Alternately, the type of program may be obtained from the user account data and the transaction amount may be determined based on this information. As another example, the user repayment amount may be inserted into the appropriate place in the answer 600 to a question about repayment of a loan. In alternate embodiments, the user specific data may be inserted at the beginning or at the end of the question and/or values for user specific data may be inserted into more than one location in the answer 600.

Figure 7:
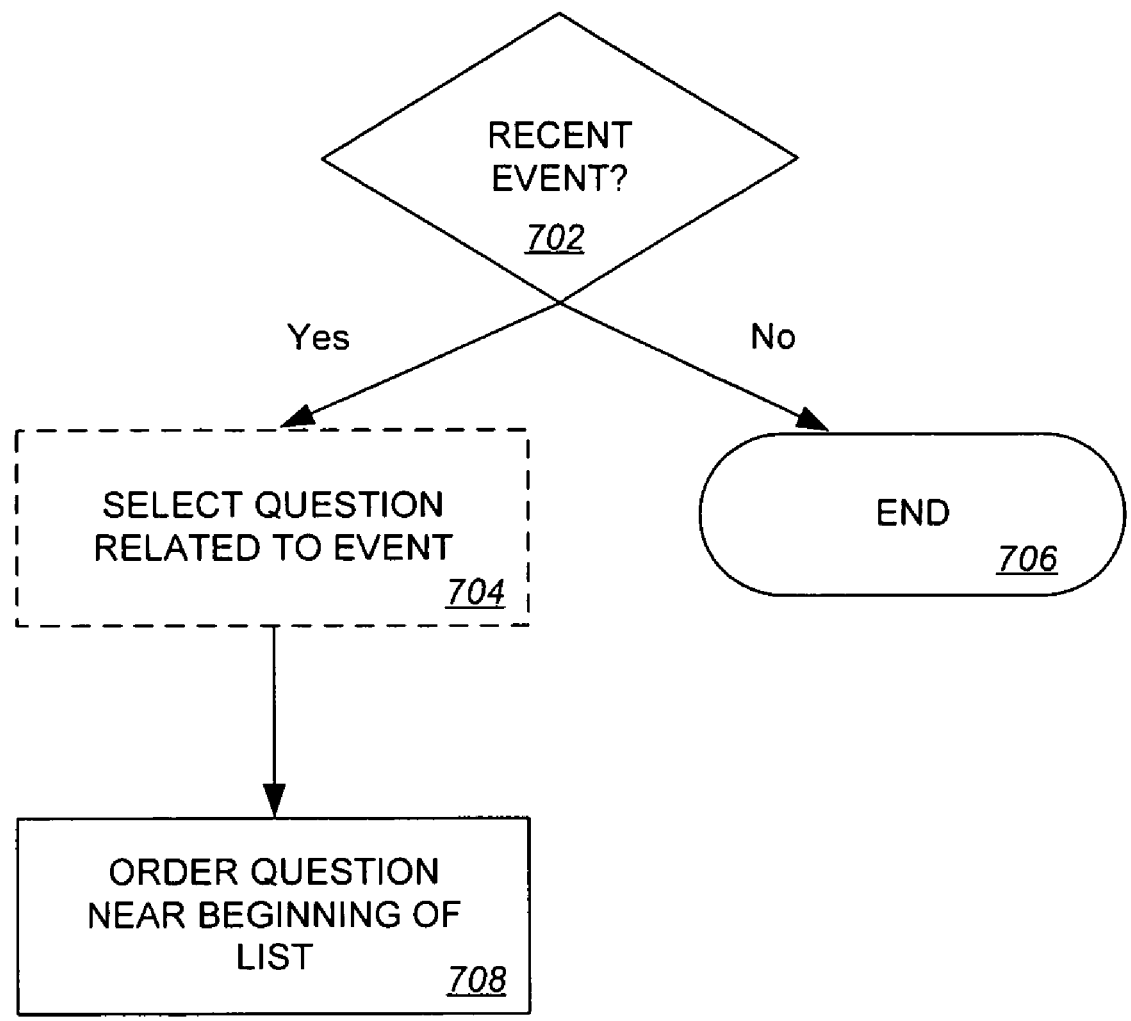
FIG. 7 is a flow diagram illustrating a method that may be used to determine a display order for a list of FAQs.

FIG. 7 illustrates an exemplary method that may be used to order the display of questions for a particular user. If a recent event or activity 702 has occurred to the user account, one or more questions related to the event may be selected 704. In another embodiment, the question(s) may have already been selected for display either because it is displayed to all users or one or more conditions for displaying the question was satisfied.

After the question(s) has been selected, the question is ordered 708 so that it appears near the beginning of the list. Other criteria, such as services for which the user may be interested, may also be ordered with a higher priority. Multiple events or activities that may occur to a user account may result in multiple questions receiving a higher display order than other questions. The relative order of these questions may be determined by a ranking of the questions and/or events.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:
   receiving a request from a user to access a frequently asked questions (FAQ) page in order to obtain financial information, wherein the FAQ page provides at least one question with an answer corresponding to the question;
   retrieving financial account data for the user, wherein the financial account data is associated with personal data related to the user; and
   selecting at least one of a set of questions to display to the user based on the financial account data so that the set of questions are personal to the user based on the personal data of the user, rather than based solely on topics selected by the user;
   wherein the selected questions along with the corresponding answers are displayed to the user.

2. The method of claim 1, further comprising formatting a set of personalized answers to the set of questions using the financial account data.

3. The method of claim 2, wherein formatting a set of personalized answers comprises selecting a first answer for a first question from a set of answers for the first question.

4. The method of claim 2, wherein selecting a first answer comprises determining when a condition for the first answer is satisfied.

5. The method of claim 2, further comprising displaying the set of questions and the set of personalized answers to the user.

6. The method of claim 2, further comprising:
before displaying the questions, determining an order for the set of questions using the user data; and
wherein displaying the set of questions comprises displaying the set of questions in the determined order.

7. The method of claim 2, wherein formatting a set of personalized answers comprises formatting at least one question to display information specific to the user by using the user financial account data.

8. The method of claim 1, wherein determining the set of questions comprises:
evaluating a condition for a first question, and
when the condition is satisfied, selecting the first question.

9. The method of claim 8, wherein the FAQ page is for a loan accelerator program and wherein the condition is the user having a repayment schedule that is a biweekly repayment schedule.

10. The method of claim 8, wherein the FAQ page is for a travel site and wherein the condition is the user having an upcoming trip.

11. The method of claim 8, wherein the FAQ page is for a online store and wherein the condition is the user having an outstanding order.

12. A computer-implemented method comprising:
receiving a request from a user to access a frequently asked questions (FAQ) page about a loan acceleration program, wherein the FAQ page provides at least one question with an answer corresponding to the question;
retrieving financial account data for the user, the account data including a type of repayment schedule for the loan acceleration program;
selecting a first question to display to the user based on type of repayment schedule; and
selecting at least one additional question to display to the user, using the account data;
wherein the selected questions along with the corresponding answers are displayed to the user.

13. The method of claim 12, further comprising:
determining that the financial account data indicates the user is eligible for a service; and
selecting an answer for one of the questions from a set of answers based on the determining.

14. The method of claim 12, further comprising formatting an answer to one of the questions using the financial account data.

15. The method of claim 14, wherein formatting an answer comprises inserting a payment amount paid by the user into the answer.

16. The method of claim 12, further comprising determining that the financial account data indicates a recent change to the account; and
selecting a second question related to the change to display to the user.

17. The method of claim 16, further comprising ordering the second question to be displayed before the first question and the additional question.

18. A system for providing a frequently asked questions (FAQ) page wherein the FAQ page provides at least one question with an answer corresponding to the question, comprising:
a first set of data containing a plurality of questions;
a second set of data containing financial account data for a plurality of users, wherein the financial account data is associated with personal data related to the user;
a third set of data containing a plurality of answers, wherein each of the answers is associated with at least one of the questions and each of the questions is associated with one or more answers;
a processor; and
logic, executed by the processor and communicatively coupled to the first set of data and the second set of data, the logic to receive a request from a user to access the frequently asked questions (FAQ) page, to retrieve from the second set of data the account data for the user, and to select a group of questions from the first set of data and associated answers from the third set of data to display to the user based on the financial account data for the user, so that the displayed group of questions are personal to the user based on the personal data of the user.

19. The system of claim 18, wherein the logic selects an answer to one of the group questions, based on the financial account data for the user, from a plurality of answers contained in the third set associated with the group question.

20. The system of claim 18, wherein the logic formats an answer to one of the group questions by inserting data obtained from the financial account data for the user into the answer.

21. The system of claim 18, further comprising a display mechanism to display the group of questions.

22. A computer-implemented method comprising:
receiving a request from a user to access a frequently asked questions (FAQ) page in order to obtain financial information, wherein the FAQ page provides at least one question with an answer corresponding to the question;
retrieving financial account data for the user, wherein the financial account data is associated with personal data related to the user; and
selecting a set of questions to display to the user based on the financial account data so that the set of questions are personal to the user based on the personal data of the user, rather than based solely on topics selected by the user;
determining an order for the set of questions based on the financial account data; and
displaying the selected questions to the user in the determined order along with the corresponding answer.

23. The method of claim 1, wherein the financial account data is related to activity in a user account.

* * * * *